United States Patent [19]

Potter

[11] Patent Number: 4,503,661
[45] Date of Patent: Mar. 12, 1985

[54] LEAF AND LAWN DEBRIS LIFT AND BAGGER

[76] Inventor: Patrick L. Potter, 8282 S. Memorial, Ste. 118, Tulsa, Okla. 74133

[21] Appl. No.: 525,399

[22] Filed: Aug. 22, 1983

[51] Int. Cl.³ ............................................ A01D 87/00
[52] U.S. Cl. ...................................... 56/16.6; 56/202; 15/79 R; 15/257.1; 37/130; 280/47.26
[58] Field of Search ........................ 56/16.6, 202, 328; 171/63; 15/79 R, 257.1, 257.4; 37/4, 118 R, 118 A, 130, 131, 134, 137, 140, 241, 265; 280/47.26

[56] References Cited

U.S. PATENT DOCUMENTS

| | | | |
|---|---|---|---|
| 652,399 | 6/1900 | Miller | 37/4 |
| 2,464,709 | 3/1949 | Orsini | 37/130 |
| 2,494,062 | 1/1950 | Sherrow | 56/202 |
| 2,544,505 | 3/1951 | Kronhaus | 37/130 |
| 2,666,662 | 1/1954 | McLeod | 37/265 |
| 3,106,303 | 10/1963 | Finocchiaro | 37/130 |

Primary Examiner—Robert P. Swiatek
Assistant Examiner—David L. Tarnoff
Attorney, Agent, or Firm—Head, Johnson & Stevenson

[57] ABSTRACT

A leaf and lawn debris lift and bagger apparatus comprising a wheeled container having a debris scooper assembly pivotally secured to the outer periphery thereof, the scooper assembly being movable between a collapsed storage position against the outer periphery of the container to a scooping position adjacent the surface of the lawn or the like wherein debris has accumulated. The debris may be swept into the interior of the extended scooper assembly, and the scooper assembly may be pivoted to a discharge position whereby the debris contained therein may fall by gravity into the interior of the container.

7 Claims, 5 Drawing Figures

LEAF AND LAWN DEBRIS LIFT AND BAGGER

BACKGROUND OF THE INVENTION

1. Field of the Invention

This invention relates to improvements in containers and more particularly, but not by way of limitation to a container for lifting debris and the like from a surface area and transferring the debris to the interior of the container.

2. Description of the Prior Art

The maintenance of lawns, and the like, usually requires the filling of relatively large containers, plastic sacks, or the like, with the debris accumulated on the surface of the lawn, such as grass clippings, leaves, and other objects which may be present. There are presently available devices that have been devised to alleviate the problems encountered with the transferring of the debris to the interior of the container, and there are frame-like holders for the usual plastic bag for supporting the bag in a relatively upright and open position for facilitating the depositing of the leaves, and the like, within the bag. Other maintenance equipment is available, such as shown in the Mason U.S. Pat. No. 1,079,785, issued Nov. 25, 1913, and entitled "Street Cleaner's Cart;" Hagerty U.S. Pat. No. 1,183,374, issued May 16, 1916 and entitled "Self-Loading Scraper;" Wenndorf U.S. Pat. No. 1,307,568, issued June 24, 1919, and entitled "Street Cleaning Machine;" Lair U.S. Pat. No. 3,007,263, issued Nov. 7, 1961, and entitled "Snow and Lawn Shovel;" Miller U.S. Pat. No. 3,037,308, issued June 5, 1962, and entitled "Combined Scoop and Garden Cart;" Finocchiaro U.S. Pat. No. 3,106,303, issued Oct. 8, 1963, and entitled "Collapsible Cart;" and the Wright U.S. Pat. No. 3,242,598, issued Mar. 29, 1966, and entitled "Shovel Cart." Whereas each of these patents show devices for easing the maintenance problems of a lawn, street area, or the like, none solves the combined problem of transferring the debris into the container or bag and storing of the debris subsequent to transfer thereof into the storage container.

SUMMARY OF THE INVENTION

The present invention contemplates a novel leaf and lawn debris lift and bagger apparatus which has been particularly designed and constructed for overcoming the foregoing disadvantages. The novel apparatus comprises a container means of substantially any suitable typical design, having a bottom, sidewalls and an open top for receiving articles therethrough. The container may be mounted on a wheeled cart member having handle means for facilitating transporting of the container from one site to another, or the container may be provided with integral wheel means mounted thereon and handle means for facilitating the manipulation of the container. A collapsible scooper device is positioned in the proximity of the outer periphery of the container and is pivotally secured thereto in a manner whereby the scooper may be selectively positioned in an open and extended position adjacent the surface of the ground or in an alternate collapsed position substantially adjacent the outer periphery of the container. When the scooper device is in the extended and open position adjacent the surface of the ground, debris and the like may be easily swept into the interior of the scooper, and when a sufficient quantity of debris has been placed in the scooper, the scooper may be readily manually pivoted about the connection thereof with the container to position the open side of the scooper above the open end of the container. The contents of the scooper device may then fall by gravity into the interior of the container, and the entire operation may be repeated until the container is full, or until all of the debris has been positioned within the container. Of course, it is also to be noted that the usual plastic leaf bag, or the like, may be disposed within the container prior to the depositing of the debris therein, and the upper edge of the bag may be secured around the open upper end of the container in any suitable or well known manner, such as by an elastic band, or the like. In this instance, the contents of the scooper may be dropped or deposited within the plastic bag, and when the bag is filled, the bag may be removed from the container and a second bag may be placed in the container whereupon the procedure may be repeated as desired or required. Of course, a suitable cover means may be provided for the container, if desired, for closing the open upper end thereof, as is well known. The novel leaf and lawn debris lift and bagger is simple and efficient in operation and economical and durable in construction.

DETAILED DESCRIPTION OF THE PREFERRED EMBODIMENT

Figure 5:
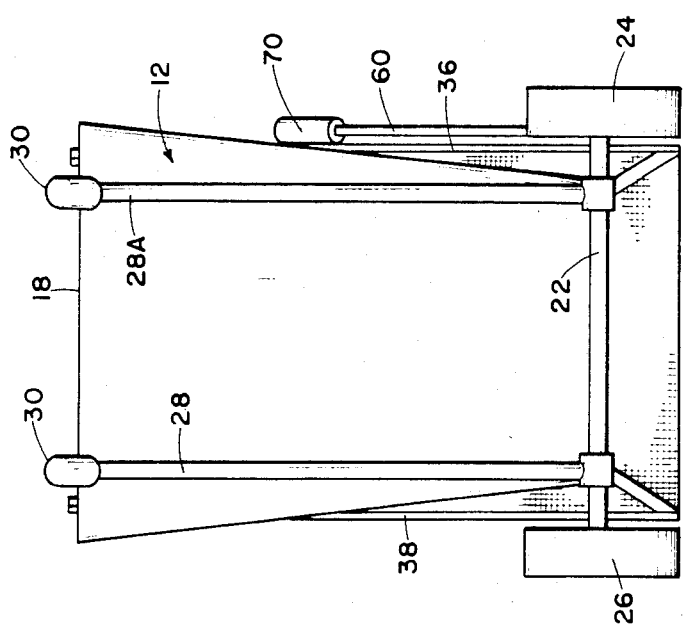
FIG. 5 is a front elevational view of a leaf and lawn debris lifter and bagger embodying the invention.

Referring to the drawings in detail, reference character 10 generally indicates a leaf and lawn debris lifter and bagger comprising a container 12 having a closed bottom 14, upstanding sidewalls 16 and an open upper end 18. As shown herein, the container 12 is mounted on or supported by a frame means 20 which includes an axle 22 (FIG. 5) having support wheels 24 and 26 suitably journalled at the opposite ends thereof for facilitating transporting of the container 12 during use thereof. In addition, a handle means 28 is provided on the frame means 20, for further facilitating the maneuvering of the container 12 as will be hereinafter set forth.

The handle means 28 as shown herein comprises a pair of spaced substantially parallel rod members 28 and 28A disposed in the proximity of or adjacent to the outer periphery of the sidewall 16 of the container 12, each terminating in a hand grip member 30 as is well known. Of course, it will be apparent that the handle means 28 may be in the form of a substantially inverted U-shaped structure, the transversely extending bar of which functions as a hand grip for maneuvering of the frame means 20 and container 12.

It will further be apparent that the wheels 24 and 26 may be journalled directly on the container 12 itself, if desired, to provide a wheeled container. In addition, whereas the wheels 24 and 26 as shown herein are disposed in the proximity of the rear portion of the container 12, it may be desirable to position the wheels substantially at the central portion of the bottom of the container, or at any other desired location or orientation therebetween. It is preferable to provide a forwardly disposed support leg 32 for the frame means 20, or directly on the container 12, as desired, for supporting the container 12 in a stationary position during the filling thereof, as will be hereinafter set forth in detail.

Figure 4:
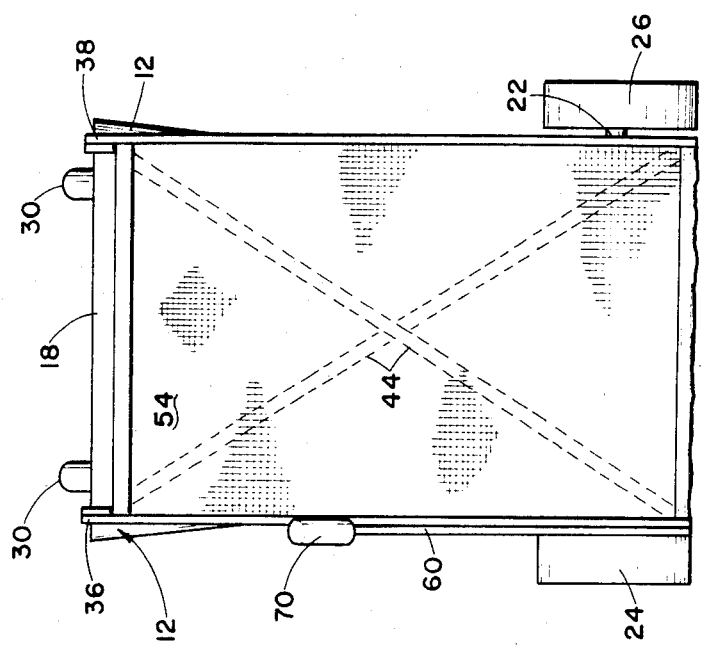
FIG. 4 is a rear elevational view of the leaf and lawn debris lifter and bagger as shown in FIG. 3.

A scooper means generally indicated at 34 is disposed in the proximity of the outer periphery of the sidewalls 16 of the container 12 and preferably oppositely disposed with respect to the handle means 28. The scooper means 34 comprises a pair of spaced substantially mutually parallel primary side arms 36 and 38, each of which is pivotally secured to the container 12 in the proximity of the open upper end 18 thereof, only one of which is shown at 40. It may be preferable to provide suitable cross-bracing means 44 (FIG. 4) secured between the arms 36 and 38 for stability thereof, as is well known. A secondary pair of spaced, parallel arm members 46 and 48 are pivotally secured at the outer ends of the primary arms 36 and 38, respectively, only one of which is shown at 50. It may also be preferable to provide suitable cross-bracing means 52 between the arms 46 and 48 for stabilization as is well known. In addition, suitable hinge means 52 is operably secured between at least one complementary pair of relatively pivotal arm members, such as the arms 36 and 46, for facilitating movement of the arms 46 and 48 between positions adjacent the respective primary arm and, alternately, positions substantially perpendicularly outwardly therefrom, as will be hereinafter set forth.

Figure 1:
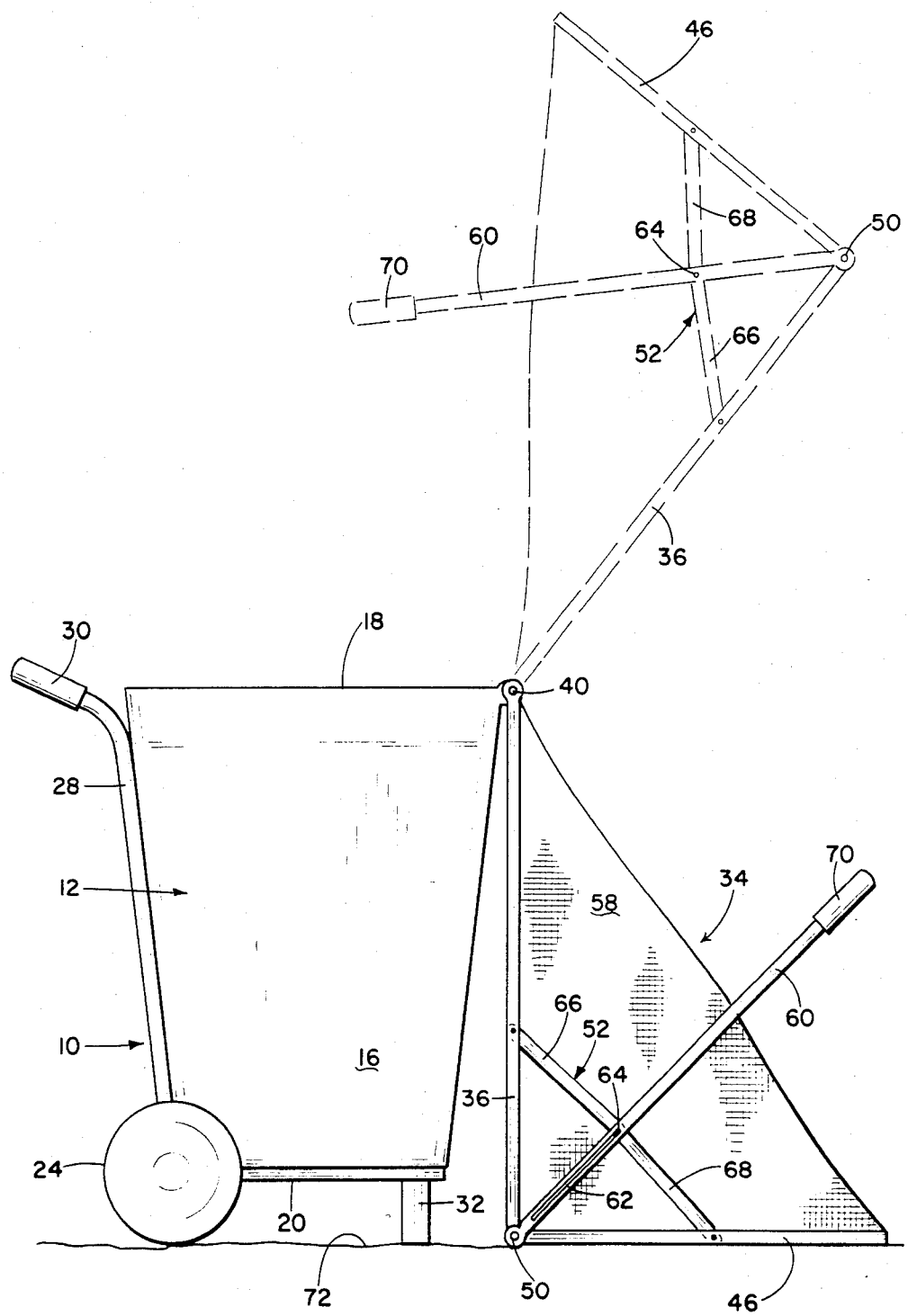
FIG. 1 is a side elevational view of a leaf and lawn debris lifter and bagger embodying the invention, with one operational position thereof shown in solid lines and another position shown in broken lines.
Figure 2:
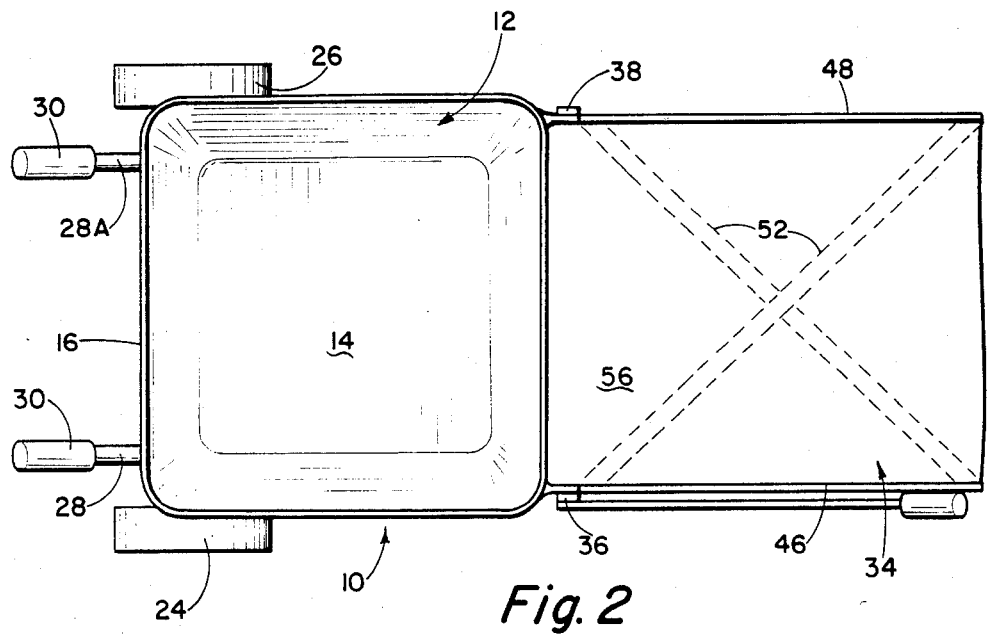
FIG. 2 is a plan view of a leaf and lawn debris lifter and bagger shown in solid lines in FIG. 1.

A suitable fabric, or the like, 54 is mounted between the primary arms 36 and 38 to form a rear wall for the scooper means 34, and a similar fabric 56 is mounted between the secondary arm 46 and 48 to provide a bottom for the scooper means 34. In addition, suitable fabric 58 is secured or mounted between the primary arm 36 and its respective secondary arm 46, and a similar fabric (not shown) is mounted between the primary arm 38 and its respective secondary arm 48, to provide side walls for the scooper means 34. A lever means 60 has one end pivotally secured to the pivot connection 50, and is operably connected with the hinge means 52 whereby rotation of the lever 60 in one direction about the pivot 50 causes the hinge means 52 to collapse or fold, and rotation of the lever 60 in an opposite direction about the pivot 50 causes the hinge means to extend, as shown in FIG. 1. The lever 60 may be connected with the hinge means 52 in any suitable manner, such as by means of an elongated aperture or slot 62 provided in the lever 60 for slidably receiving a pin 64 therein. The pin 64 may be secured to the hinge means 52, or may be the pivot pin connection between the links 66 and 68 of the hinge means 52, as desired. Of course, it is preferable to provide a suitable hand grip means 70 at the outer end of the lever 60 for facilitating manual manipulation of the lever, as is well known.

In use, the leaf and lawn debris lift and bagger apparatus 10 may be readily manipulated or moved to the desired location for retrieval of debris by manually grasping the handle means 28 and moving the apparatus about by the rotation of the wheels 24, as is well known. When the apparatus 10 is positioned at the desired location on a lawn 72 or the like, the handle means 28 may be released whereby the apparatus will be supported on the surface of the lawn by the wheels 24 and support means 32. If desired, a suitable leaf bag (not shown) or any well known type may be placed in the interior of the container 12, and a suitable fastener means (not shown), such as an elastic band or the like, may be utilized for removably securing the open upper end of the plastic bag to the open upper end 18 of the container 12.

Of course, the debris, such as leaves and the like, which have accumulated on the lawn 72 may be manually retrieved in the usual manner and deposited within the container 12, or within the bag (not shown) disposed therein. However, it may be preferable to accumulate a relatively large quantity of the lawn debris in a common site on the lawn, such as by hand raking, or the like, as is well known, with the accumulation of debris being in the proximity of the apparatus 10. The lever 60 may then be manually grasped and pivoted about the pivot 50 in the proper direction for moving the arms 46 and 48 to the outwardly extending position therefor, as shown in solid lines in FIG. 1. In this position the fabric portion 56 becomes a bottom for the scooper means 34, and the debris may be manually maneuvered into the scooper means 34 in the manner as in the use of a common or well known dust pan. When a sufficient quantity of the debris has thus been transferred to the interior of the scooper means 34, the lever means may be utilized for pivoting the entire scooper means 34 about the pivot connections 40 and to the position shown in broken lines in FIG. 1. When the scooper means 34 is in the upper position, the debris contained therein will fall by gravity into the interior of the container 12 (or the bag [not shown] disposed therein). When the scooper means 34 has thus been emptied of its contents, the entire operation may be repeated by pivoting the scooper means 34 to its extended position.

Figure 3:
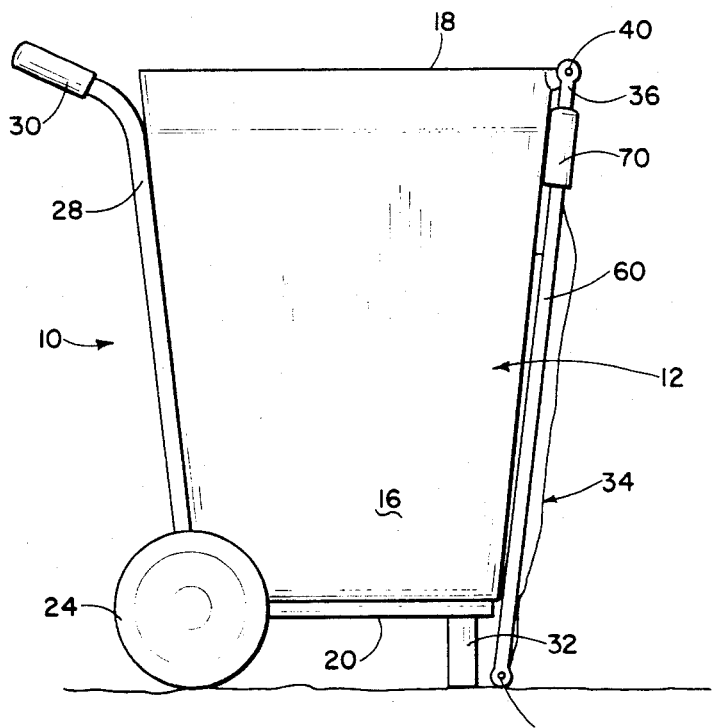
FIG. 3 is a side elevational view of a leaf and lawn debris lifter and bagger embodying the invention, with the leaf scooper portion thereof depicted in the collapsed position thereof.

When the container 12 is full, or when the bag disposed therein has been filled, the container may be emptied in the usual manner by easily transporting the entire apparatus 10 to a site for disposal. The container may be emptied into another holding means, or the container may be left for future emptying, as desired. Of course, in the case of a filled leaf bag (not shown) the leaf bag may be removed from the container, and closed in the usual manner, whereupon the bag may be placed for later retrieval, as is well known, and the apparatus 10 may be reused as required for completing the debris retrieval operation. When the apparatus 10 is not in use the lever 60 may be pivoted to the storage position thereof against the outer periphery of the container as shown in FIG. 3.

Of course, it will be apparent that the scooper means 34 may be removably secured to the container 12, if desired, whereby the scooper means may be utilized with substantially any suitable container.

From the foregoing it will be apparent that the present invention provides a novel leaf and lawn debris lift and bagger which greatly facilitates the retrieval and disposal of debris from an area, such as a lawn or the like. The novel apparatus comprises a wheeled container having a scooper means pivotally secured to the outer periphery thereof and movable between a scooping or material retrieving position and a storage position. The novel scooper apparatus may be utilized in the manner of the well known dust pan for retrieving debris from a surface, and may be manually pivoted to a discharge position for transferring the debris to the interior of the container.

Whereas the present invention has been described in particular relation to the drawings attached hereto, it should be understood that other and further modifications, apart from those shown or suggested herein may be made within the spirit and scope of this invention.

What is claimed is:

1. A leaf and lawn debris lift and bagger apparatus comprising wheeled upstanding container means having the upper end thereof open providing access to the interior thereof, and scooper means pivotally secured to the outer periphery of the container means in the proximity of one edge of the open upper end thereof, said scooper means having a collapsed storage position and an extended scooping position and being movable to said collapsed storage position that is substantially adjacent to the outer periphery of a sidewall of the container means and movable from said collapsed position to said extended scooping position radially outward from the sidewall of the container and open to the area surrounding the container and scooper means for receiving debris therein.

2. A leaf and lawn debris lift and bagger apparatus as set forth in claim 1 wherein the scooper means comprises primary frame means having one side thereof pivotally secured to the container means, secondary frame means pivotally secured to another side of the primary frame means and movable between a position adjacent the primary frame means and a position substantially perpendicularly outwardly therefrom, flexible covering means provided on the primary frame means and secondary frame means forming a bottom and back for the scooper means, and second flexible covering means provided between the primary and secondary frame means and disposed at the opposite sides thereof to provide side members for the scooper means.

3. A leaf and lawn debris lift and bagger apparatus as set forth in claim 2 and including hinge means secured between the primary frame means and secondary frame means for facilitating movement of the scooper means between the collapsed and extended positions therefor.

4. A leaf and lawn debris lift and bagger apparatus as set forth in claim 1 and including a pair of spaced wheels operably secured to the container means for facilitating transporting thereof.

5. A leaf and lawn debris lift and bagger apparatus as set forth in claim 4 and including handle means operably connected with the container means for facilitating maneuvering thereof.

6. A leaf and lawn debris lift and bagger apparatus as set forth in claim 5 and including support means disposed in spaced relation with respect to the wheels for cooperating therewith to support the container means in a stationary position during utilization thereof.

7. A leaf and lawn debris lift and bagger apparatus comprising wheeled container means having at least one open end providing access to the interior thereof, and scooper means pivotally secured to the outer periphery thereof, said scooper means being movable between a collapsed storage position substantially adjacent the outer periphery of the container means and an extended scooping position extending radially outwardly from the container means and open to the area surrounding the container and scooper means for receiving debris therein, the scooper means comprising primary frame means having one side thereof pivotally secured to the container means, secondary frame means pivotally secured to another side of the primary frame means and movable between a position adjacent the primary frame means and a position substantially perpendicularly outwardly therefrom, flexible covering means provided on the primary frame means and secondary frame means forming a bottom and back for the scooper means, and second flexible covering means provided between the primary and secondary frame means and disposed at the opposite sides thereof to provide side members for the scooper means, and including hinge means secured between the primary frame means and secondary frame means for facilitating movement of the scooper means between the collapsed and extended positions therefor, and including lever means operably connected between the primary and secondary frame means and the hinge means for actuation of the hinge means to provide said collapsed and extended positions for the scooper means.

* * * * *